(12) United States Patent
Ren et al.

(10) Patent No.: US 11,215,990 B2
(45) Date of Patent: Jan. 4, 2022

(54) MANUAL DIRECTION CONTROL COMPONENT FOR SELF-DRIVING VEHICLE

(71) Applicant: LINGDONG TECHNOLOGY (BEIJING) CO. LTD, Beijing (CN)

(72) Inventors: Guorong Ren, Beijing (CN); Botao Zheng, Beijing (CN); Liye Yang, Beijing (CN); Ou Qi, Beijing (CN)

(73) Assignee: LINGDONG TECHNOLOGY (BEIJING) CO. LTD, Beijing (CN)

( * ) Notice: Subject to any disclaimer, the term of this patent is extended or adjusted under 35 U.S.C. 154(b) by 135 days.

(21) Appl. No.: 16/301,003

(22) PCT Filed: Nov. 2, 2018

(86) PCT No.: PCT/CN2018/113592
§ 371 (c)(1),
(2) Date: Nov. 13, 2018

(87) PCT Pub. No.: WO2020/087490
PCT Pub. Date: May 7, 2020

(65) Prior Publication Data
US 2020/0142401 A1    May 7, 2020

(51) Int. Cl.
*G05D 1/00*    (2006.01)
*G05D 1/02*    (2020.01)

(52) U.S. Cl.
CPC ......... *G05D 1/0061* (2013.01); *G05D 1/0088* (2013.01); *G05D 2201/0216* (2013.01)

(58) Field of Classification Search
CPC ............... G05D 1/0061; G05D 1/0088; G05D 2201/0216; B60R 2225/00; B60R 1/00; H04N 2101/00; H04N 1/00; G01C 1/00
(Continued)

(56) References Cited

U.S. PATENT DOCUMENTS 5,657,828 A  *  8/1997  Nagamachi ............. B60L 50/52
                                                   180/19.3
2003/0056481 A1*  3/2003  Trefz .................. A01D 34/6806
                                                   56/11.1
(Continued)

FOREIGN PATENT DOCUMENTS

CN         105077950 A  *  11/2015
CN         105077950 A     11/2015
(Continued)

OTHER PUBLICATIONS

International search report of the International Application No. PCT/CN2018/113592 dated Jul. 31, 2019.

*Primary Examiner* — Abby Y Lin
*Assistant Examiner* — Hossam M Abd El Latif
(74) *Attorney, Agent, or Firm* — NZ Carr Law Office PLLC (57) ABSTRACT

Embodiments of the present disclosure include automated guided vehicles (AGVs) having a U-shaped handle. The U-shaped handle can be pull down to change operation of the AGV. In one embodiment, a self-driving system is provided. The system includes a body having one or more motorized wheels, a console coupled in an upright position to an end of the body, and a handle pivotally coupled to the console, the handle being movable with respect to the console to change operation of the self-driving system between a self-driving mode and a manual control mode.

20 Claims, 7 Drawing Sheets

(58) Field of Classification Search
USPC .......................................................... 701/23
See application file for complete search history.

(56) References Cited

U.S. PATENT DOCUMENTS

| | | | | |
|---|---|---|---|---|
| 2005/0257509 | A1* | 11/2005 | Derby | A01D 34/824 |
| | | | | 56/10.8 |
| 2009/0241350 | A1* | 10/2009 | Lau | A01G 3/053 |
| | | | | 30/199 |
| 2017/0050659 | A1* | 2/2017 | Cardano | B62D 5/046 |
| 2017/0190335 | A1* | 7/2017 | Gillett | G05D 1/0278 |
| 2017/0223891 | A1* | 8/2017 | Nier | A01D 34/68 |
| 2019/0287063 | A1* | 9/2019 | Skaaksrud | B65D 88/524 |

FOREIGN PATENT DOCUMENTS

| | | | | |
|---|---|---|---|---|
| CN | 204309852 | | 5/2016 | |
| DE | 10106997 | B4 * | 11/2004 | ............. G06K 17/00 |
| GB | 2102160 | A | 1/1983 | |

\* cited by examiner

MANUAL DIRECTION CONTROL COMPONENT FOR SELF-DRIVING VEHICLE

BACKGROUND

Field

Embodiments disclosed herein relate to improved self-driving vehicle systems having a manual control device.

Description of the Related Art

Automatic Guided Vehicles (AGVs) are driverless, programmable controlled vehicles that can transport articles or inventory items from designated pickup area(s) to unloading area(s) within a facility. Conventional AGVs have a handle for an operator to control the steering of the vehicle, for example, by pulling the handle in a direction. While the handle in the conventional AGVs provides controlled movement of the vehicle, there exists a need for improved AGVs with better design.

SUMMARY

In one embodiment, a self-driving system is provided. The system includes a body having one or more motorized wheels, a console coupled in an upright position to an end of the body, and a handle pivotally coupled to the console, the handle being movable with respect to the console to change operation of the self-driving system between a self-driving mode and a manual control mode.

In another embodiment, the system includes a body having one or more motorized wheels, the body having a first end and a second end opposing the first end, a console coupling in an upright position to the first end of the body, and a U-shaped handle having distal ends pivotally attached to the console, the U-shaped handle being movable with respect to the console.

In yet another embodiment, a method of operating a self-driving system is provided. The method includes operating the self-driving system in a self-driving mode, and changing the self-driving mode from the self-driving mode to a manual operation mode by pulling down a U-shaped handle, the U-shaped handle being pivotally attached to the self-driving system and is movable with respect to the self-driving system.

BRIEF DESCRIPTION OF THE DRAWINGS

FIG. 38 illustrates one embodiment where a handle is held in a pull down position.

FIG. 68B is a schematic view of a warehouse according to another embodiment.

To facilitate understanding, identical reference numerals have been used, where possible, to designate identical elements that are common to the figures. It is contemplated that elements disclosed in one embodiment may be beneficially utilized with other embodiments without specific recitation.

DETAILED DESCRIPTION

Embodiments of the present disclosure relate to automated guided vehicles (AGVs) having a U-shaped handle. The U-shaped handle can be pull down to change operation of the AGV from a self-driving mode to a manual operation mode. The U-shaped handle also has a control stick configured to control moving direction of the AGV. While the term AGV is used, the concept of this disclosure can be applied to any self-driving systems or mobile robots, such as autonomously-navigating mobile robots, inertially-guided robots, remote-controlled mobile robots, and robots guided by laser targeting, vision systems, or roadmaps. Various embodiments are discussed in greater detail below with respect to FIGS. 1-7.

Figure 1:
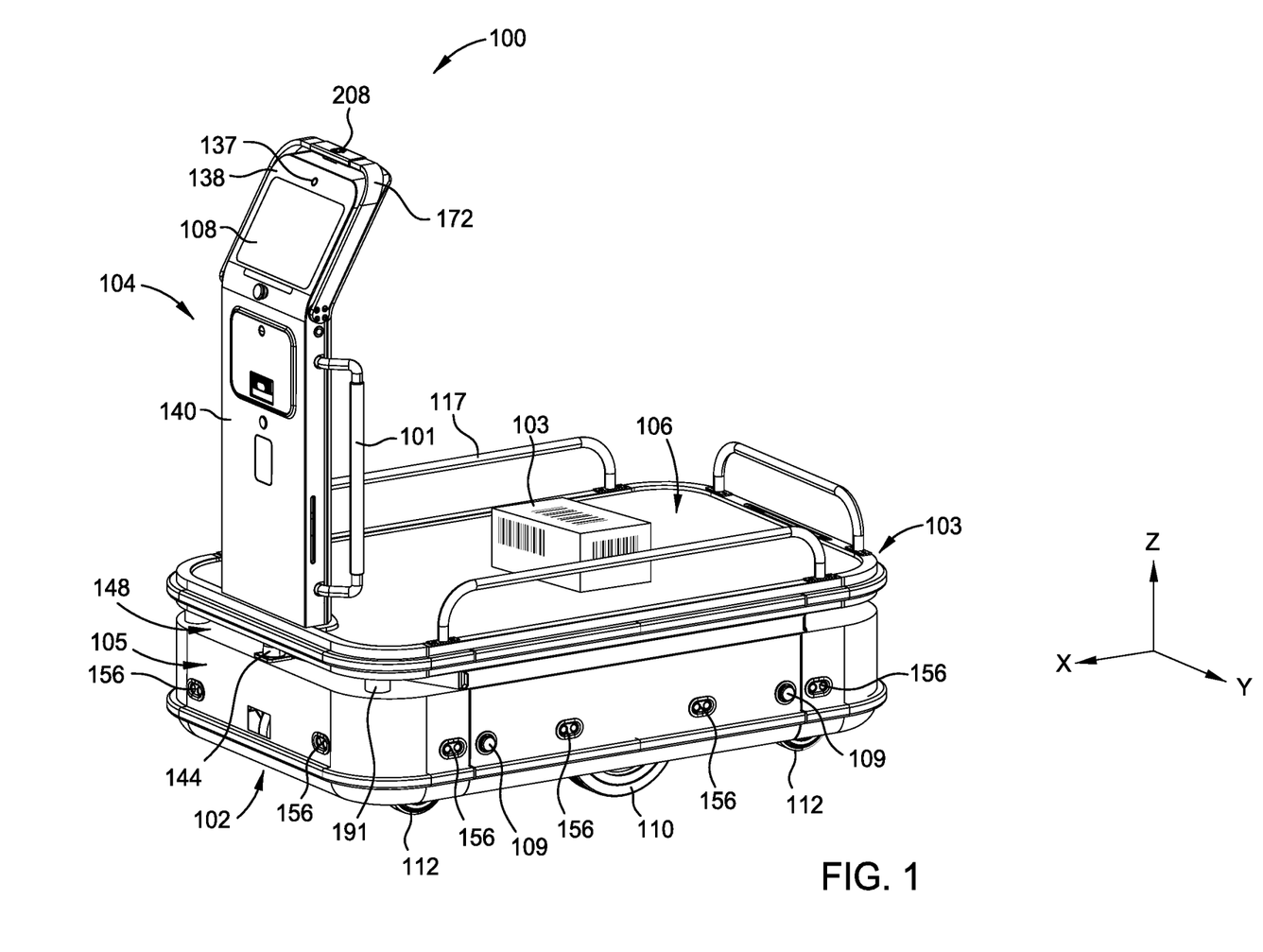
FIG. 1 is a perspective view of an automated guided vehicle (AGV) according to one embodiment.

FIG. 1 is a perspective view of an automated guided vehicle (AGV) 100 according to one embodiment. The AGV 100 is adapted to drive itself without an operator. The AGV 100 generally includes a mobile base 102 and a console 104. The mobile base 102 has a rear end 103 and a front end 105 opposing the rear end 103. The console 104 has an upper portion 138 and a main body 140. The main body 140 of the console 104 is coupled to the front end 105 of the mobile base 102 in a standing or upright configuration. One or more rods 101 are optionally provided on either side of the main body 140 to allow an operator to hold and manipulate movement of the AGV 100.

The console 104 has a display 108 configured to display information. The display 108 allows the operator to control the operation of the AGV 100. The display 108 can be any suitable user input device for providing information associated with operation tasks, map of the facility, routing information, inventory information, and inventory storage, etc. If manual use of the AGV is desired, the operator can override the automatic operation of the AGV 100 by entering updated commands via the display 108, or by pulling down a handle 172 that is pivotally coupled to the console 104. Embodiments of the handle 172 will be discussed in greater detail below with respect to FIGS. 2 to 58.

The mobile base 102 has one or more motorized wheels 110 and a plurality of stabilizing wheels 112. The motorized wheels 110 are configured to rotate and/or roll in any given direction to move the AGV 100. For example, the motorized wheels 110 can rotate about the Z-axis and roll forward or backward on the ground about its axel spindle along any directions, such as along the X-axis or along the Y-axis. In this disclosure, moving forward refers to the situation when the front end 105 is the leading end and moving backward refers to the situation when the rear end 103 is the leading end. In some cases, the AGV 100 has one or more emergency stop button 109 that can be pressed to stop moving of the AGV 100. The motorized wheels 110 may be controlled to roll at different speed. The stabilizing wheels 112 may be caster-type wheels. If desired, any or all of the stabilizing wheels 112 may be motorized.

The mobile base 102 has an upper surface 106 that can be used to support inventory 103 or a human operator (not shown). In some embodiments, the mobile base 102 may include one or more guard rails 117 raised from edges of the upper surface 106 to prevent inventory 103 from sliding off during operation. The AGV 100 is configured to move the inventory 103 autonomously between designated areas within a facility based on pre-stored commands or instructions received from a remote server, which can be a warehouse management system (WMS).

The AGV 100 includes one or more cameras for capture images and/or videos of the surroundings of the AGV 100. In some embodiments, the AGV 100 includes an overview camera 137 disposed on the console 104, for example at an area adjacent the display 108. The overview camera 137 is facing away from the rear end 103 of the AGV 100 and is used for object/obstacle detection and avoidance. In some cases, the overview camera 137 can also be configured to identify a shelf and/or an operator so that the AGV 100 can maintain a proper/pre-determined distance with the operator under various operation modes, such as a people following mode.

The longitudinal direction of the upper portion 138 of the console 104 is held at an angle with respect to the longitudinal direction of the main body 140. The angle is chosen so that the overview camera 137 can identify the near objects effectively. The angle may be in a range from about 105° to about 165°, such as about 120° to about 150°. Wider or narrower range of angles is contemplated and can be adjusted depending on the application.

The AGV 100 may include one or more proximity sensors to detect the presence of objects nearby and/or measure distances from the objects nearby. For example, one or more sensors 156 may be provided around the mobile base 102 (only two sides are shown). The sensors 156 may be any suitable sonar sensors, ultrasonic sensors, infrared sensors, radar sensors, LiDAR sensors and/or any suitable proximity sensors that can be configured to detect the presence of nearby objects. Each sensor 156 can be configured to sense a field of view greater about 90 degrees.

In some embodiments, one or more sensors 144 may be further provided at the front end 105 and the rear end 103 of mobile base 102, respectively, for obstacle avoidance. For example, the sensors 144 may be provided at the front end 105 and the rear end 103 (only front end is shown). The sensor 144 can be disposed at a cutout 148 below the console 104. The cutout 150 extends across the width of the mobile base 102 and may expand radially outwardly from the sensor 144 to the edge of the mobile base 102. The expansion of the cutout 148 allows the sensors to provide greater sensing area for the AGV 100. Alternatively or additionally, a sensor 191 similar or identical to the sensor 144 may be disposed at one or more corners of the mobile base 102. Likewise, the sensor 144, 191 may be any suitable sonar sensors, ultrasonic sensors, infrared sensors, radar sensors, and/or laser sensors such as LiDAR (light detection and ranging) sensors that can be configured to maintain proper distance and detect the presence of nearby objects that are stationary or moving. Each sensor 144, 191 can be configured to sense a field of view greater about 90 degrees, for example about 270 degrees.

Figure 2:
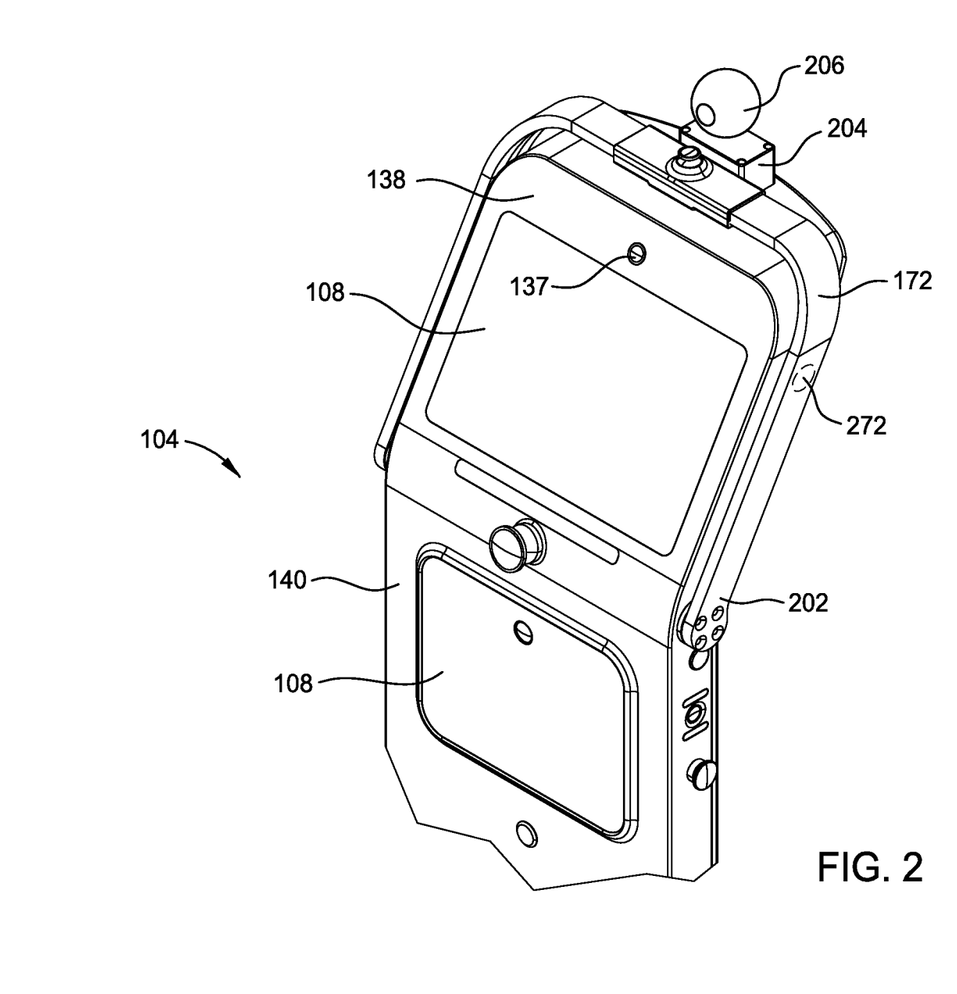
FIG. 2 illustrates a perspective view of a portion of a console according to one embodiment.

FIG. 2 illustrates a perspective view of a portion of the console 104 according to one embodiment. The console 104 is shown to have a handle 172 attached thereto. The handle 172 may be in the form of a U-shaped structure. The U-shaped handle 172 has distal ends 202 pivotally attached to the upper portion 138 of the console 104. In one embodiment, the distal ends 202 of the handle 172 are positioned at the junction between the upper portion 138 and the main body 140. While a U-shaped structure is shown, the handle 172 can be configured to have other shape with pivot points positioned at any desired location, e.g., at the main body 140 of the console 104.

The handle 172 is movable with respect to the console 104. In various embodiments, the handle 172 is configured to move with respect to the console 104 between a retracted position and a pull down position. When the handle 172 is held in a retracted position, such as the position shown in FIG. 3A, the longitudinal direction of the handle 172 is substantially parallel with the longitudinal direction of the upper portion 138 of the console 104. When the handle 172 is held in a pull down position, such as the position shown in FIG. 3B, the longitudinal direction of the handle 172 (i.e., the longitudinal axis of handle portion having distal ends) may have an angle of about 65° to about 120° with respect to the longitudinal direction of the upper portion 138 or the main body 140. In the embodiment shown in FIG. 2, the handle 172 is in the retracted position. When the handle 172 is in the pull down position, the AGV 100 is switched to a manual control mode from a self-driving mode, which can be any operation mode, such as a self-navigation mode, a leading mode, or a people following mode, etc. In some cases, the AGV 100 may be stationary and not under any operation mode prior to switching to a manual control mode.

A stage 204 can be optionally disposed at the upper portion 138 of the console 104 to support a camera 206. In one embodiment, the camera 206 is removably coupled to the stage 204. The camera 206 configured to have two axes of rotation (e.g., vertical rotation and horizontal rotation). The camera 206 has an optical zoom and is capable of recording visual images and/or detecting the presence of nearby objects and may include a monocular camera, a binocular camera, and/or a stereo camera. In one embodiment, the camera 206 is configured to detect and follow an object (e.g., a human operator) in motion. In another embodiment, the camera 206 has a beam pointer and is operable to produce a laser beam. The camera 206 can be controlled to scan a barcode, a marker, or an identifier of one or more objects disposed on a shelf/AGV 100, and/or a barcode, a marker, or an identifier disposed on the shelf.

The handle 172 has a control stick 208 disposed at the center of the U-shaped structure. The control stick 208 can be inclined in an arbitrary direction including up, down, left, and right within 360 degrees. The control stick 208 is in communication with a controller of the AGV 100 to control a driving module, and can be used to perform various operations of the AGV 100. In operation, a human operator can use the control stick 208 to control steering of the AGV 100. For example, the AGV 100 may be configured to: (1) move backward when the control stick 208 is inclined towards up direction; (2) move forward when the control stick 208 is inclined towards down direction; (3) move to the right when the control stick 208 is inclined towards right direction; and (4) move to the left when the control stick 208 is inclined towards left direction. The control stick 208 is also configured to stop movement of the AGV 100 when the control stick 208 is pressed down. Having the control stick 208 disposed at the center of the handle 172 allows the AGV 100 to identify a human operator and provide the task instructions associated with the human operator. In addition, the human operator can view the task instructions shown on the display 108 conveniently while steering the AGV 100 with the control stick 208.

In some embodiments, the human operator may not manually control steering of the AGV 100 unless the handle 172 is pulled down to switch the AGV 100 from an operation mode to the manual control mode. Operation mode can be a navigating mode, a leading mode, or a people following mode, etc. For example, the AGV 100 may be operated under a self-navigation mode moving from location A to location B. When the handle 172 is pulled down (i.e., in a pull down position) by a human operator, the AGV 100 will stop the self-navigation mode and switch to a manual control mode. The human operator then use the control stick 208 to manipulate the moving direction of the AGV 100 by moving the control stick 208 up, down, left, or right. The human operator may walk along with the AGV 100 while controlling the control stick 208.

In some embodiments, the handle 172 can be in the retracted position and configured to allow the human operator to control the moving direction of the AGV 100. For example, the human operator may stand on the AGV 100 and manually control movement of the AGV 100 through the control stick 208. The human operator and/or the remote server can provide an instruction to the AGV 100 to change the setting about triggering the control stick 208 with regard to the position of the handle 172.

While the control stick 208 is shown disposed at the center of the handle 172, the control stick 208 can be placed at any location. For example, the control stick 208 can be disposed at the side of the handle 172, which is represented by a dashed line 272 for ease of illustration. Having the control stick 208 located at the side of the handle 172 can be advantageous as it allows the human operator to walk with the AGV 100 without blocking the viewing of the camera 206. This is beneficial when the AGV 100 is programmed to memorize/construct the initial map of a facility, such as a warehouse.

Figure 3A:
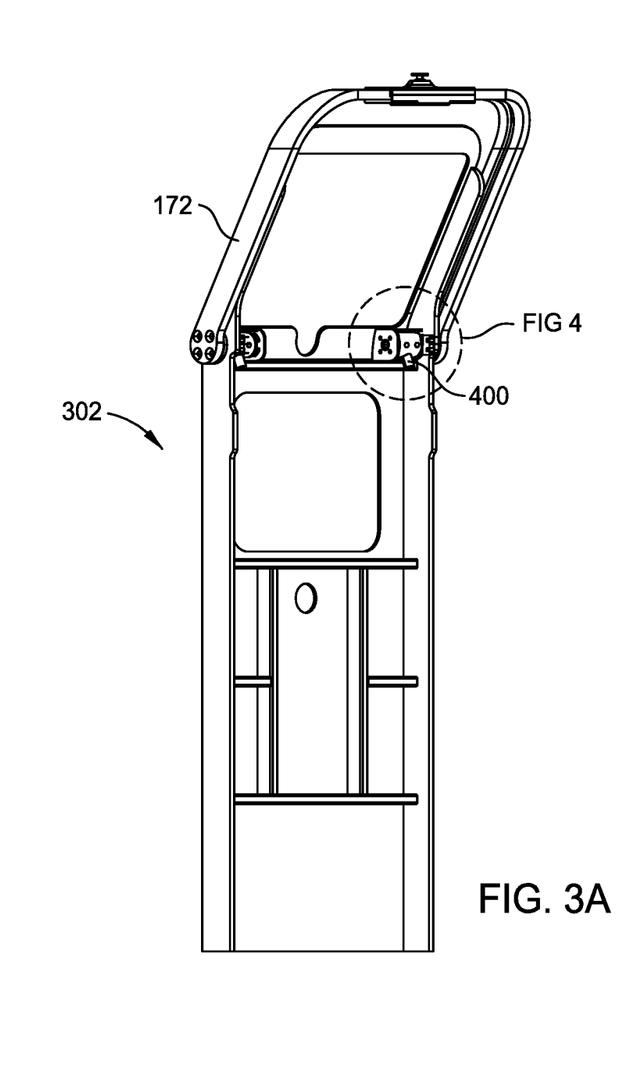
FIG. 3A illustrates one embodiment where a handle is held in a retracted position.
Figure 3B:
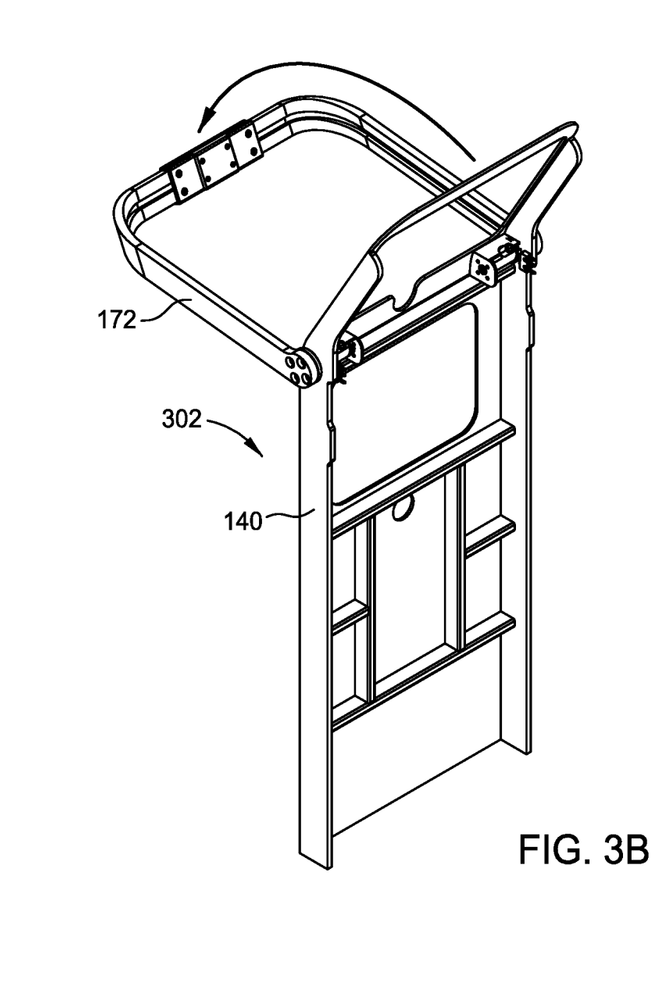

FIG. 3A illustrates one embodiment where the handle 172 is held in a retracted position. FIG. 3B illustrates one embodiment where the handle 172 is held in a pull down position. The handle 172 has a switch device 400 which is in electrical communication with a controller of the AGV 100 and is configured to change operation mode of the AGV 100. For ease of illustration, only front covers 302 of the console 104 are shown. When the handle 172 is pulled down, the AGV 100 is configured to switch from an operation mode to a manual control mode. When the handle 172 is pulled up from the pull down position to the retracted position, the AGV 100 is switched back to the previous operation mode (i.e., an operation mode prior to switching to the manual control mode), or any operation mode pre-set by the human operator or the remote server.

Figure 4:
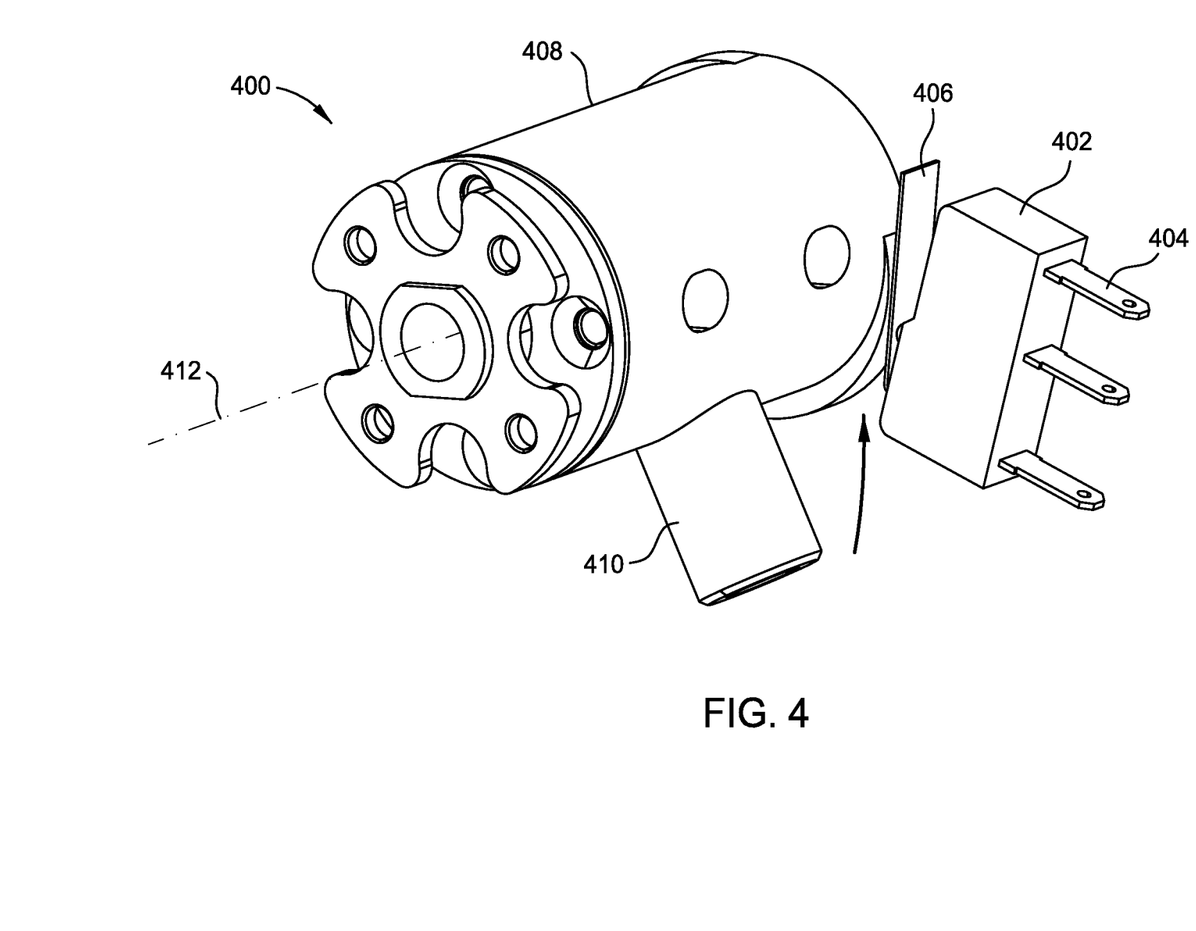
FIG. 4 is an enlarged view of a switch device shown in FIG. 3A according to one embodiment.

FIG. 4 is an enlarged view of a switch device shown in FIG. 3A according to one embodiment. The switch device 400 is disposed within the console 104 and can be triggered by rotation of the handle 172 to change the operations mode of the AGV 100. The switch device 400 generally includes a switch 402 having a plurality of contact pins 404, a spring 406 coupled to the switch 402, and a rotary contact 408. The rotary contact 408 has a cylindrical body with a protrusion 410 extending outwardly from the cylindrical body. The rotary contact 408 is coupled to the handle 172 and is rotatable about a virtual pivot axis 412. The contact pins 404 are inserted into the AGV 100 and in electrical communication with a controller of the AGV 100. When the handle 172 is pulled down, the protrusion 410 is brought into contact with the spring 406 (i.e., a contact engaging position), which triggers the switch 402 to change the AGV 100 from an operation mode to a manual control mode. When the handle 172 is pulled back up, the protrusion 410 disengages the spring 406 (i.e., a contact disengaged position) which triggers the switch 402 to change the AGV 100 from the manual control mode to an operation mode. It is contemplated that the switch device 400 is mere an example. Any suitable switch capable of sending a two-state switching signal in response to the rotation of the handle 172 can also be used.

Figure 5A:
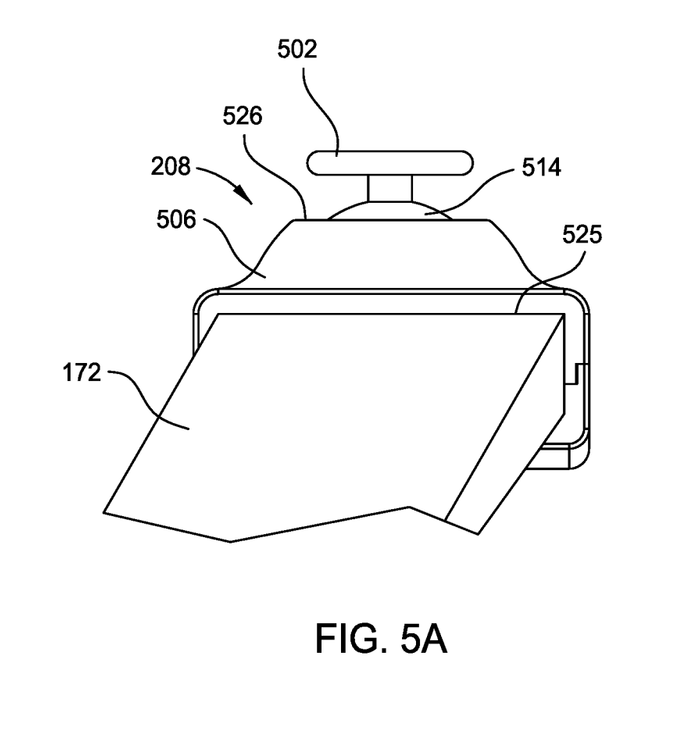
FIG. 5A illustrates a cross-sectional view of a control stick according to one embodiment.
Figure 5B:
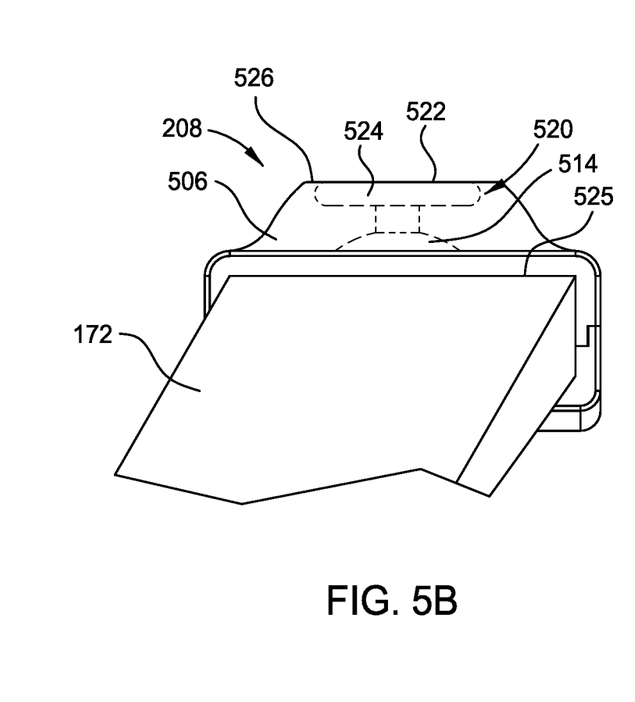
FIG. 5B illustrates a cross-sectional view of a control stick according to another embodiment.

FIG. 5A illustrates a cross-sectional view of the control stick 208 according to one embodiment. The control stick 208 has a thumb grip 502 and a moving section 514 coupling to the thumb grip 502. The moving section 514 is mounted on a top surface 526 of a base 506. The base 506 is disposed on a top surface 525 of the handle 172. The thumb grip 502 can tilt with respect to the base 506 in all directions of 360° to control steering of the AGV 100, as discussed above. FIG. 5B illustrates a cross-sectional view of a control stick 520 according to another embodiment. Likewise, the control stick 520 has a thumb grip 524 and a moving section 514 coupling to the thumb grip 524. In this embodiment, the control stick 520 is disposed within the base 506 so that the top surface 522 of the thumb grip 524 is flush with the top surface 526 of the base 506. Therefore, the control stick 520 is protected by the base 506.

Figure 6A:
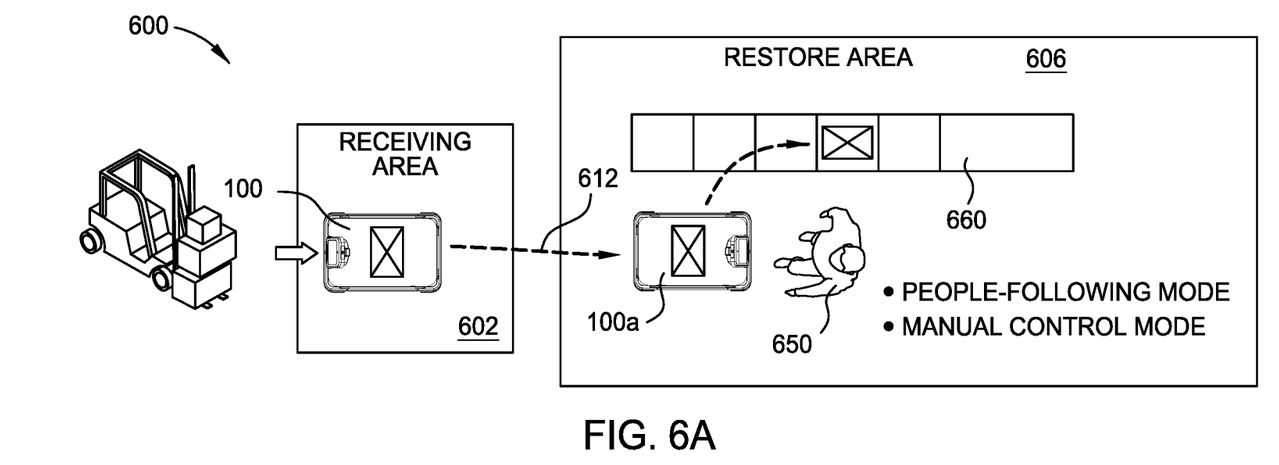
FIG. 6A is a schematic view of a warehouse using the AGV for transporting packages/inventories.

FIG. 6A is a schematic view of a warehouse 600 using the AGV 100 for transporting packages/inventories. The warehouse 600 may include a receiving area 602 and a restore area 606. In one embodiment shown in FIG. 6A, the AGV 100 is first loaded with packages at the receiving area 602. Upon the package loading is complete, the AGV 100 may receive instructions from a remote server to transport the packages to the restore area 606. In some embodiments, the AGV 100 transports the packages from the receiving station 602 to the restore area 606 through route 612 under the self-navigating mode. The route 612 may be chosen by the remote server or selected by the AGV 100 based on the map information in the storage device of the AGV 100. The combination of the information recorded, detected, and/or measured by the camera 206, the overview camera 137, and one or more sensors on the AGV 100, as well as the map information of the facility stored in the AGV 100 can be used to help autonomously move the AGV 100 from the receiving area 602 to the restore area 606.

When arriving at the restore area 606, the AGV 100 interacts with a human operator 650. In some embodiments, the AGV 100 may stop upon arrival of the restore area 606 while the signal lights to indicate that the AGV 100 is waiting for unloading. The human operator 650 may come to the waiting AGV 100 to interact with the AGV 100 through the display 108. For example, the AGV 100 may use the camera 206 to capture the image of the human operator 650 and send the image to the remote server. The remote server identifies the human operator 650 based on the information stored in the remote server, and sends a task instruction to the AGV 100 based on the role of the human operator 650 and the packages on the AGV 100. The AGV 100 receives and displays the task information on the display 108. The human operator 650 may then unload the packages to the shelf 660.

Additionally or alternatively, the human operator 650 may set the AGV 100 to the "people following mode" through the touch screen on the display 108. The AGV 100 uses the camera 206 to capture the image of the human operator 650 and abstract the characteristics of the human operator 650, such as facial features, clothing and/or pose of the human operator, for purpose of following the human operator 650. To follow the human operator 650, the AGV 100 may turn around to move forward, with the front end 105 as the leading end, with the console 104 facing the human operator 650.

Additionally or alternatively, if a manual control mode is desired, the human operator 650 may either select from the display 108 or pull down the handle 172 to switch the AGV 100 from any operation mode (e.g., self-navigating mode, people following mode, etc.) to a manual control mode and start control movement of the AGV 100 using the control stick 208, as discussed above.

Figure 6B:
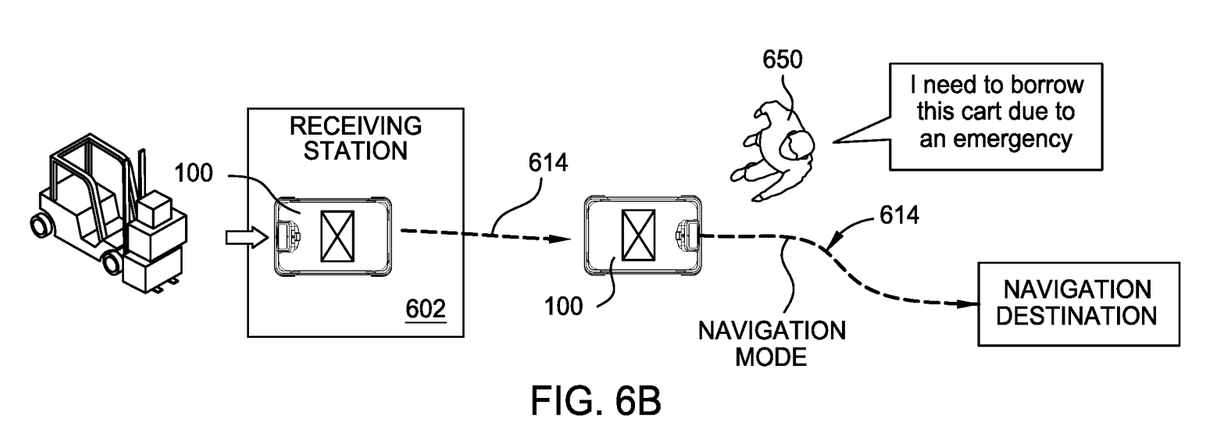

FIG. 6B is a schematic view of the warehouse 600 according to another embodiment. In this embodiment, the AGV 100 is first loaded with packages at the receiving area 602. Upon the package loading is complete, the AGV 100 may receive instructions from the remote server to transport the packages to a destination, such as a restore area, a charging station, or any location within the warehouse 600. The AGV 100 transports the packages from the receiving station 602 to the destination through route 614 under the self-navigating mode. The route 614 may be chosen by the remote server or selected by the AGV 100 based on the map information in the storage device of the AGV 100. In cases where the AGV 100 is needed for emergency use, the human operator 650 can stop the AGV 100 by pressing the emergency stop button 109 or pulling down the handle 172 to interrupt the self-navigating mode of the AGV 100.

In some embodiments, which can be combined with other embodiments of the present disclosure, the AGV 100 is configured so that the remote server may not instruct the AGV 100 to go to a destination or perform certain tasks when the handle 172 is pulled down. This feature allows the human operator 650 to fully control the AGV 100 without worrying about the AGV 100 being called away by the remote server. Additionally or alternatively, the human operator 650 may provide instruction to the AGV 100 via the display 108 to temporally prevent the AGV 100 from receiving a navigation order from the remote server.

Figure 7:
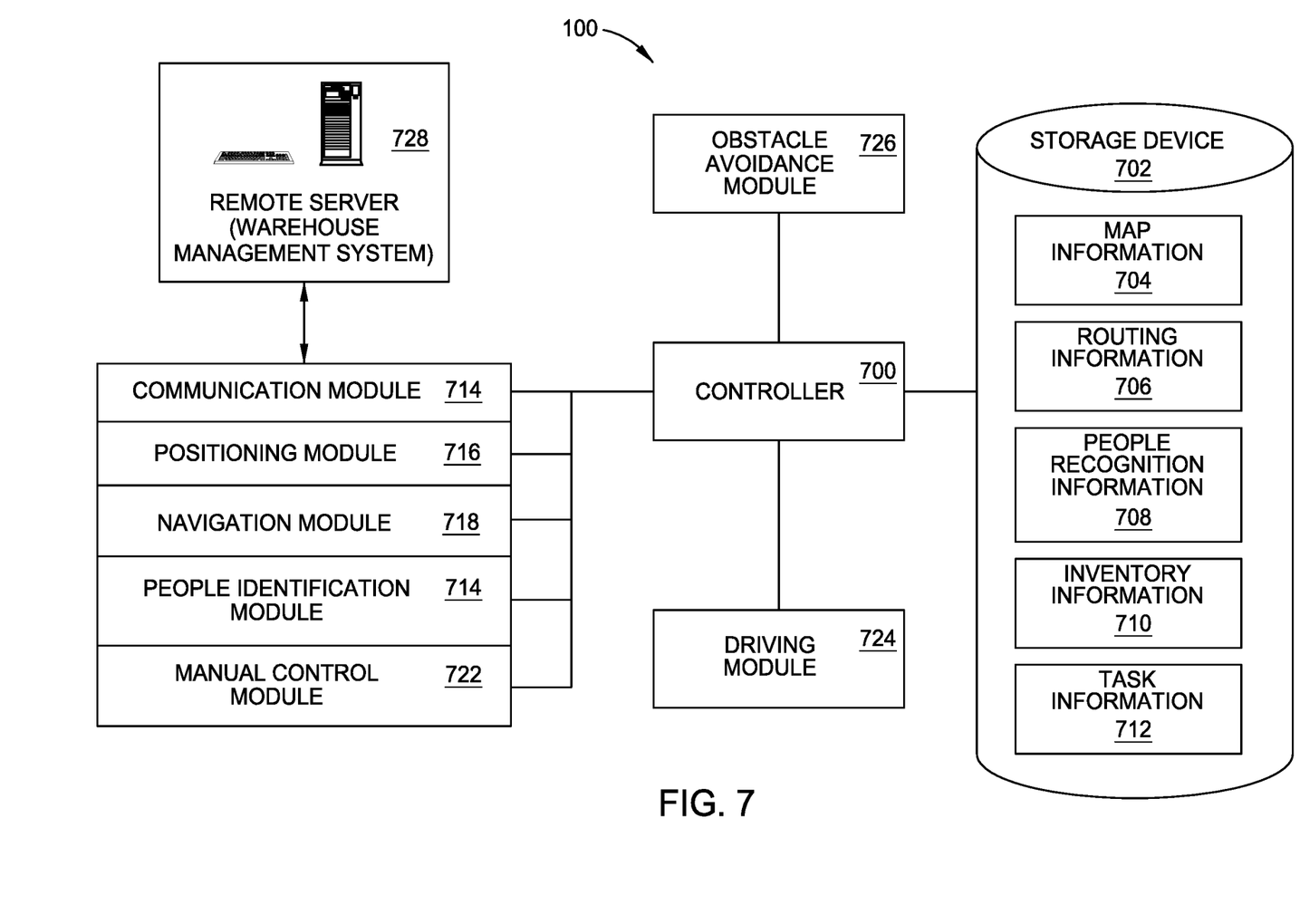
FIG. 7 is a block diagram of the AGV according to one embodiment.

FIG. 7 is a block diagram of the AGV 100 according to one embodiment. The AGV 100 includes a controller 700 configured to control various operations of the AGV 100, which may include any combination of the embodiments discussed in this disclosure, or any type of task as needed using the AGV 100. The controller 700 may be a programmable central processing unit (CPU) or any suitable processor that is operable with a memory. The controller 700 is in communication with a storage device 702 containing data for performing operations, such as map information 704, routing information 706, people recognition information 708, inventory information 710, task information 712, and the likes. The controller 700 is also in communication with several modules configured to control the operations of the AGV 100. In some embodiments, the modules include a communication module 714, a positioning module 716, a navigation module 718, a people identification module 720, a manual control module 722, a driving module 724, and an obstacle avoidance module 726.

The communication module 714 is configured to transmit or receive information/instruction from a server, such as a system controller 728 which may be a warehouse management system. The positioning module 716 is configured to communicate information regarding the position of the AGV 100 to the controller 700. The positioning module 716 may include GPS, WiFi access points, and/or Bluetooth beacons so that the remote server 728 and/or a human operator can find the location of the AGV 100 at any time. The navigation module 718 may include information relating to a current location of the AGV 100, a target destination, and location-dependent navigation options. The controller 700 can use the communication module 714, the positioning module 716, and the navigation module 718 to perform a self-navigation mode. The people identification module 720 is configured to communicate information regarding facial features of the operator, a shape of the operator, bone structures of the operator, a pose/gesture of the operator, a clothing of the operator, or any combination thereof, to the controller 700. The people identification module 720 is configured to receive information of the operator to perform a people following mode. The manual control module 722 is configured to communicate instruction from an interface (e.g., display 108) and/or a control stick (e.g., control stick 208) to the controller 700 when a manual control mode is triggered (e.g., by pulling down the handle 172). The driving module 724 is configured to control movement of the motorized wheels of the AGV 100.

The obstacle avoidance module 726 is configured to control and receive information from the cameras (e.g., overview camera 137 and camera 206) and/or sensors (e.g., sensors 144, 156) of the AGV 100.

The controller 700, the modules 714-726, and/or the data contained on the storage device 702 are used to control the movement/operation of the AGV 100, all based at least in part on the information received from the proximity sensors (e.g., sensors 144, 156), the cameras (e.g., cameras 206, 137), and from the remote server 728. The controller 700 is configured to analyze the information received or retrieved from the cameras, the proximity sensors, the data on the storage device 702, and/or any of the modules and in response to control the operation of the AGV 100, including the motorized wheels (e.g., motorized wheels 110, 112), and/or the information displayed on the display of the AGV 100 (e.g., display 108).

While the foregoing is directed to embodiments of the disclosure, other and further embodiments of the disclosure thus may be devised without departing from the basic scope thereof, and the scope thereof is determined by the claims that follow.

The invention claimed is:

1. A self-driving system, comprising:
a mobile base having one or more motorized wheels;
a console having an upper portion and a main body, the main body being coupled in an upright position to an end of the mobile base;
a handle pivotally coupled to the upper portion of the console, the handle being movable with respect to the console between a retracted position and a pull down position to change operation of the self-driving system between a self-driving mode and a manual control mode; and
a control stick disposed on the handle, the control stick being operable to control moving direction of the self-driving system;
wherein a longitudinal direction of the handle is parallel with a longitudinal direction of the upper portion when the handle is held in the retracted position;
wherein the longitudinal direction of the handle has an angle of 65° to 120° with respect to the longitudinal direction of the upper portion when the handle is moved to the pull down position from the retracted position resulting in changing operation of the self-driving system to the manual control mode from the self-driving mode.

2. The system of claim 1, wherein the handle is a U-shaped structure.

3. The system of claim 2, wherein the control stick is disposed at the center of the U-shaped structure.

4. The system of claim 2, wherein the control stick is disposed at the side of the U-shaped structure.

5. The system of claim 1, further comprising:
a camera removably coupled to the console, the camera providing two axes of rotation and is configured to detect and follow an object in motion.

6. A self-driving system, comprising:
a mobile base having one or more motorized wheels, the mobile base having a first end and a second end opposing the first end;
a console having an upper portion and a main body, the main body being coupling in an upright position to an end of the mobile base;
a camera disposed at the console, wherein the camera is operable to detect and follow an object in motion;
a U-shaped handle having distal ends pivotally attached to the upper portion of the console, the U-shaped handle being operable to move with respect to the console between a retracted position and a pull down position to change operation of the self-driving system between a people following mode and a manual control mode, wherein the self-driving system is directed to follow a human operator based on information received from the camera when operated under the people following mode; and
a control stick disposed on the U-shaped handle, the control stick being operable to control moving direction of the self-driving system;
wherein a longitudinal direction of the handle is parallel with a longitudinal direction of the upper portion when the handle is held in the retracted position;
wherein the longitudinal direction of the handle has an angle of 65° to 120° with respect to the longitudinal direction of the upper portion when the handle is moved to the pull down position from the retracted position resulting in changing operation of the self-driving system to the manual control mode from the self-driving mode.

7. The system of claim 6, wherein the self-driving system is operated under the manual control mode when the U-shaped handle is in the pull down position.

8. The system of claim 6, wherein the control stick is disposed at the center of the U-shaped handle.

9. The system of claim 6, wherein the control stick is disposed at the side of the U-shaped handle.

10. The system of claim 6, wherein control stick further comprising:
a base disposed on a top surface of the handle;
a thumb grip; and
a moving section coupled to the thumb grip, and the thumb grip is operable to tilt with respect to the base in all directions of 360°.

11. The system of claim 10, wherein the moving section is mounted on a top surface of a base.

12. The system of claim 10, wherein the moving section is disposed within the base so that a top surface of the thumb grip is flush with a top surface of the base.

13. The system of claim 5, wherein the self-driving mode is a people following mode, and the self-driving system is directed to follow a human operator based on information received from the camera when operated under the people following mode.

14. The system of claim 13, wherein the camera further comprises a beam pointer, and the beam pointer is operable to produce a laser beam.

15. The system of claim 13, wherein the information is characteristics of the human operator.

16. The system of claim 6, wherein the camera further comprises a beam pointer, and the beam pointer is operable to produce a laser beam.

17. The system of claim 6, wherein the information is characteristics of the human operator.

18. The system of claim 17, wherein the characteristics comprise facial features, clothing and/or pose of the human operator.

19. A self-driving system, comprising:
a mobile base having one or more motorized wheels;
a console having an upper portion and a main body, the main body being coupled in an upright position to an end of the mobile base;
a handle pivotally coupled to the upper portion of the console, the handle being movable with respect to the console between a retracted position and a pull down position to change operation of the self-driving system between a self-driving mode and a manual control mode; and
a control stick disposed on the handle, the control stick being operable to control moving direction of the self-driving system, wherein control stick further comprising:
a base disposed on a top surface of the handle; and
a thumb grip disposed over a top surface of the base, the thumb grip being operable to tilt with respect to the base in all directions of 360° to control steering of the mobile base;
wherein a longitudinal direction of the handle is parallel with a longitudinal direction of the upper portion when the handle is held in the retracted position;
wherein the longitudinal direction of the handle has an angle of 65° to 120° with respect to the longitudinal direction of the upper portion when the handle is moved to the pull down position from the retracted position resulting in changing operation of the self-driving system to the manual control mode from the self-driving mode.

20. The system of claim 19, wherein the moving section is disposed within the base so that a top surface of the thumb grip is flush with a top surface of the base.

* * * * *